US012692974B2

(12) United States Patent
Van Dongen

(10) Patent No.: US 12,692,974 B2
(45) Date of Patent: Jul. 28, 2026

(54) PORTABLE SUPPORT STAND COMPRISING A VIBRATION DAMPER

(71) Applicant: DOVI GROUP B.V., Etten-Leur (NL)

(72) Inventor: Franciscus Adrianus Cornelis Van Dongen, Etten-Leur (NL)

(73) Assignee: DOVI GROUP B.V., Etten-Leur (NL)

( * ) Notice: Subject to any disclaimer, the term of this patent is extended or adjusted under 35 U.S.C. 154(b) by 22 days.

(21) Appl. No.: 18/838,946

(22) PCT Filed: Mar. 2, 2023

(86) PCT No.: PCT/NL2023/050100
§ 371 (c)(1),
(2) Date: Aug. 15, 2024

(87) PCT Pub. No.: WO2023/167586
PCT Pub. Date: Sep. 7, 2023

(65) Prior Publication Data
US 2025/0155073 A1 May 15, 2025

(30) Foreign Application Priority Data
Mar. 2, 2022 (NL) ...................................... 2031138

(51) Int. Cl.
*F16F 7/00* (2006.01)
*F16F 7/09* (2006.01)
(Continued)

(52) U.S. Cl.
CPC ............. *F16M 11/34* (2013.01); *F16F 7/108* (2013.01); *F16M 11/041* (2013.01);
(Continued)

(58) Field of Classification Search
CPC .... F16F 7/09; F16F 7/095; F16F 7/00; F16M 2200/08; F16M 11/38; F16M 11/32; F16M 11/26; F16M 11/242; F16M 11/2007
(Continued)

(56) References Cited

U.S. PATENT DOCUMENTS 5,037,086 A * 8/1991 Strand ...................... A63B 4/00
248/560
5,885,189 A * 3/1999 Lane ........................ A63B 4/00
248/560
(Continued)

FOREIGN PATENT DOCUMENTS

| CN | 109469809 | 3/2019 |
| CN | 110630865 | 12/2019 |
| WO | 0235969 A1 | 5/2002 |

OTHER PUBLICATIONS

International Search Report and Written Opinion for International Application No. PCT/NL2023/050100, mailed Jun. 6, 2023, 8 pages.

Primary Examiner — Alfred J Wujciak
(74) Attorney, Agent, or Firm — KDW Firm PLLC

(57) ABSTRACT

A portable supporting stand for supporting a portable metrology device, such as a laser tracker device, at a predefined height includes at least one leg having an elongated member, where, in a deployed state, the portable supporting stand is a substantially rigid support stand that is arranged to substantially rigidly support the portable metrology device on a floor surface. The portable supporting stand also includes a vibration damper unit for reducing vibrations of the portable supporting stand.

21 Claims, 6 Drawing Sheets

(51) Int. Cl.

| | |
|---|---|
| *F16F 7/108* | (2006.01) |
| *F16M 11/04* | (2006.01) |
| *F16M 11/32* | (2006.01) |
| *F16M 11/34* | (2006.01) |
| *F16M 11/38* | (2006.01) |
| *G01B 11/00* | (2006.01) |

(52) U.S. Cl.
CPC ......... *F16M 11/046* (2013.01); *G01B 11/005* (2013.01); *F16F 7/00* (2013.01); *F16F 7/09* (2013.01); *F16F 7/095* (2013.01); *F16F 2222/08* (2013.01); *F16F 2236/08* (2013.01); *F16M 11/32* (2013.01); *F16M 11/38* (2013.01); *F16M 2200/08* (2013.01)

(58) Field of Classification Search
USPC ......... 248/188.1, 188.2, 188.3, 188.6, 188.7, 248/188.8, 165, 166, 168, 169, 170, 171, 248/439, 560, 561, 562, 566
See application file for complete search history.

(56) References Cited

U.S. PATENT DOCUMENTS

| | | | |
|---|---|---|---|
| 7,409,791 B2 * | 8/2008 | Moody ................... | F41A 23/08 |
| | | | 42/72 |
| 2015/0233522 A1 * | 8/2015 | Kallas ................ | F16M 11/2021 |
| | | | 403/322.2 |
| 2023/0184372 A1 * | 6/2023 | Thomason ............ | F16B 7/1409 |
| | | | 248/157 |

* cited by examiner

Figure 2:
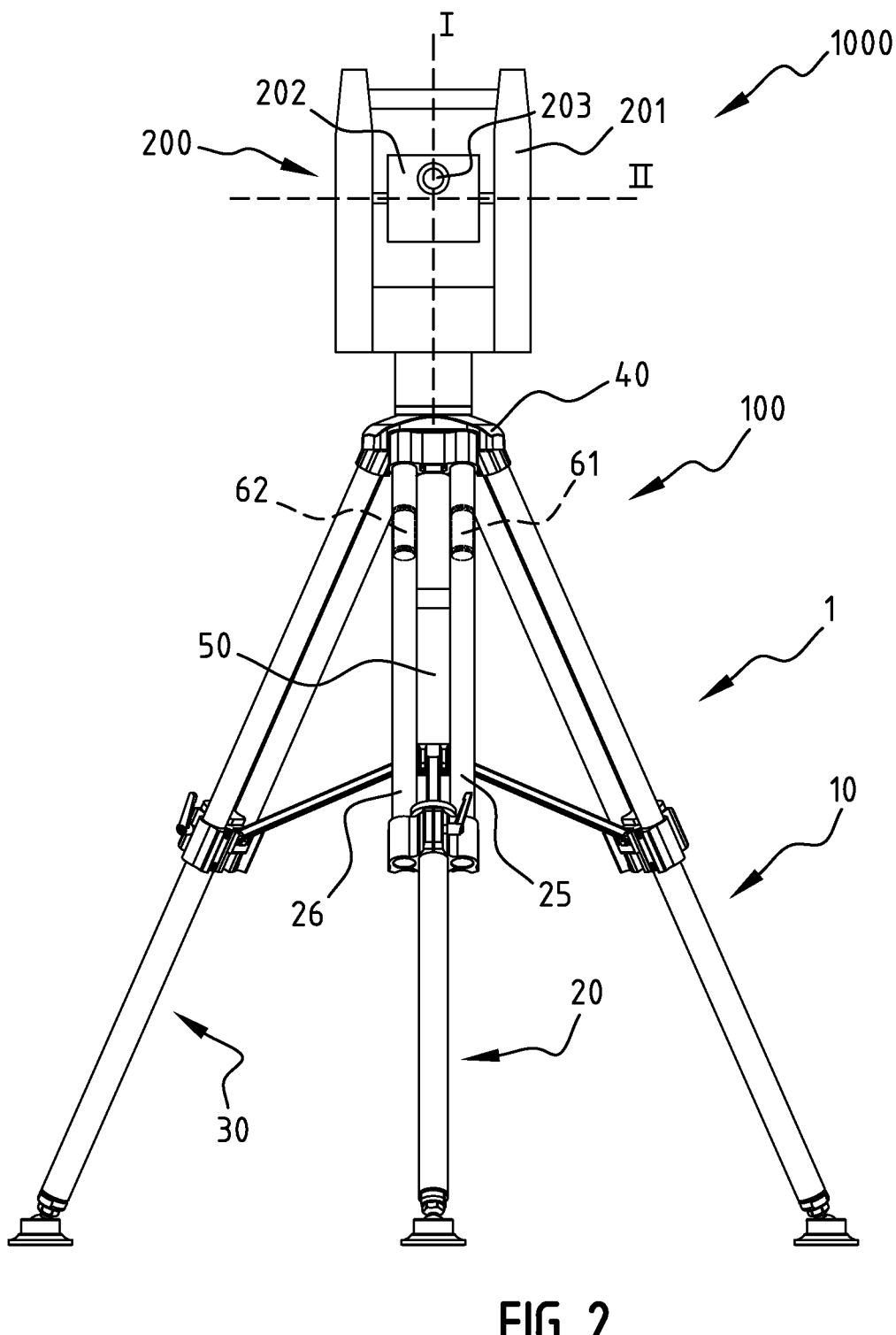

<u>FIG. 2</u>

Figure 5:
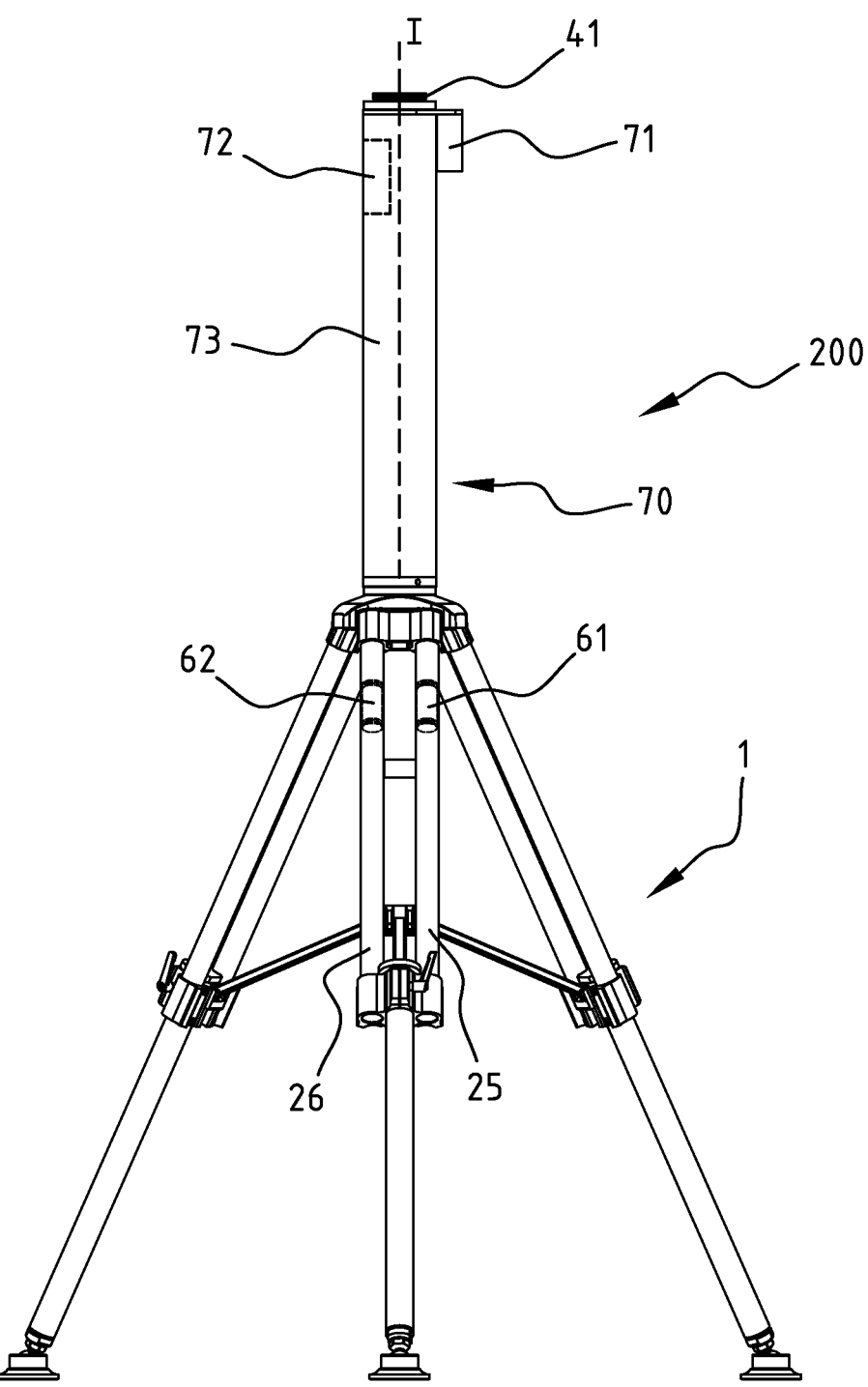

<u>FIG. 5</u>

PORTABLE SUPPORT STAND COMPRISING A VIBRATION DAMPER

This application is a national stage filing under 35 U.S.C. 371 of pending International Application No. PCT/NL2023/050100, filed Mar. 2, 2023, which claims priority to Netherlands patent application 2031138, filed Mar. 2, 2022, the entirety of which applications are incorporated by reference herein.

The invention relates to a portable supporting stand for supporting a portable metrology device, an extending member for use in a portable supporting stand for supporting a portable metrology device and a portable metrology system.

In all types of industries, for instance when assembly large structures, in for instance civil engineering, automotive, aerospace, high-precision machine industries, but also when producing and/or assembling small, high precision instruments for, for instance, medical purposes, accurate measurements of parts and/or an accurate alignment between the different parts and/or substructures is typically required. In these applications portable metrology devices, in particular coordinate measurement machines, such as laser trackers, are often used to constantly measure multiple points in order to ensure correction dimensioning and/or an accurate alignment is achieved.

Laser trackers are portable coordinate measurement machines that accurately measure large objects by determining the positions, i.e. 3D coordinates, of objects and/or of optical targets held against those objects. The accuracy of a typical laser tracker is of the order of 0.025 mm over a distance of several meters. Three-dimensional laser trackers are fitted with a measurement head comprising the laser that is rotatable along two substantially perpendicular axes, thereby enabling measurements in a spherical space surrounding the measurement head. High-end laser trackers are able to measure up to a 1000 measurement points per second. In order to support these portable laser trackers at the desired, predefined height, portable supporting stands, such as foldable tripods that can comprise telescopic legs, are typically used.

As measurement accuracy is of most importance, a high stability of the portable supporting stand is important, such that the portable supporting stands typically have a very high static stiffness, i.e. substantially rigid, such that (quasi-)static loads do not substantially deform the portable supporting stand as this influences the accuracy of the measurements. These portable supporting stands are therefore typically made from substantially rigid (i.e. having a relatively very high stiffness) elements that are connected in a substantially rigid manner.

The varying movement of the measurement head introduces time-varying inertia force (i.e. dynamic forces) that excite the measurement setup, often comprising of the laser tracker that is mounted on top of a portable support stand. These dynamic forces can excite certain resonances in the measurement setup, such that the resulting vibrations, which can comprise relatively small torsional vibrations (i.e. angular vibrations around a vertical axis that is substantially perpendicular to the floor surface) of the portable support stand to which the laser tracker is fixed, and/or different parts and/or component of the portable support stand. This causes the laser tracker to experience the same small torsional (i.e. angular) vibrations. However, when measurement at several meters, or even tens of meters away, these small angular vibrations result in relatively large displacements of the laser beam taking the measurements. Hereby, significant measurements errors are introduced, or in severe cases, even compromise the entire measurement as the laser tracker is no longer able to measure the positions of the object and/or the optical targets all together.

In order to resolve these vibrational issues, it is current practice to downgrade the performance of these laser trackers by, for instance, decreasing the speeds and acceleration of the measurement head of the laser tracker, thereby the amount of measurement points that are taken per second are also decreased. Hereby, accelerations of the measurement head are reduced, such that the resulting vibrations are also reduced. Nonetheless, this comes at the cost of the measurement time needed, or the measurement resolution (i.e. the number of points that can be measured). Providing for a heavier supporting stand would negatively affect the portability, i.e. transportability, of the supporting stand, as it would become too heavy to be carried by a single person. Alternatively, supporting stands have been fitted with shock absorbers in the legs, such as rubber and/or elastic feet that are arranged at the lower end of the legs of such supports. However, these shock absorbers lead to a significant decrease of the overall stiffness (i.e. an increase of the flexibility) of the support stand, such that these support stands cannot be consider to be substantially rigid, as the support stands deforms, under the influence of static and/or dynamic loads applied, in such a manner that this influences the accuracy of the measurements.

CN110630865A discloses a camera fixing device with the anti-shake function. By arranging an anti-shake mechanism, the problem of instantaneous shaking in the operation process of a camera can be prevented; the anti-shaking mechanism can absorb the shaking energy situation and lowers the shaking influence on the camera, and the anti-shake capability is effectively improved from the structure of a supporting fixing mechanism; and through the structure formed by the cylindrical torsion discs, the diagonal bracing columns and the circulation disc column, the capability of absorbing shaking in an up-down direction and the circumferential direction can be well realized, and the shaking influence is lowered.

It is a goal of the invention to provide for a portable supporting stand for supporting a portable metrology device that is easily transportable and enables fast and accurate measurements, wherein at least some of the above mentioned problems is at least partially alleviated.

In a first aspect, the invention relates to a portable supporting stand for supporting a portable (optical) metrology device, in particular a portable coordinate measurement machine (PCCM), such as a laser tracker device, at a predefined height comprising at least one leg comprising an elongated member, wherein, in a deployed state, the portable supporting stand is a, preferably substantially rigid, support stand that is arranged to, preferably substantially rigidly, support the portable metrology device on a floor surface, and wherein the portable supporting stand further comprises a vibration damper unit for reducing vibrations of the portable supporting stand.

As the portable supporting stand is preferably a substantially rigid stand, wherein the supporting stand, for instance as the members of the supporting stand that are in the static load path running from a portable metrology device to the supporting floor surface, is/are sustainably rigid, the portable supporting stand is a very low damped system that can be susceptible to vibration caused by resonance. The respective members can for instance be made from metals, such as aluminium alloys, titanium alloys, magnesium alloys, and/or (stainless) steel alloys, composite materials, comprising for instance glass and/or carbon fibres, and/or high-stiffness plastic materials having a Young's modulus of at least 1 GPa, preferably at least 2 GPa, more preferably at least 3 GPa, most preferably at least 5 GPa.

Hence, by combining the vibration damper and the substantially rigid portable supporting stand, a portable supporting stand is obtained that is both highly stable in a static sense (i.e. has a high resistance to static deformations) and that is also dynamically highly stable, such that any vibrations of the setup due to the dynamic loading of the measurement device are reduced and/or minimized. Fast and accurate measurements can thus be obtained using the measurement setup. A supporting stand that is highly stable in a static sense, can for instance be obtained by arranging the substantially rigid support stand to substantially not deform under the influence of the weight of the portable metrology device. Preferably, the vibration damper unit is arranged for reducing vibrations of the portable supporting stand without altering the position of, and/or moving, the portable metrology device with respect to the floor surface. This enables to achieve the above-mentioned effect of fast and accurate measurements can thus be obtained using the measurement setup.

In a preferred embodiment, the vibration damper unit is arranged for damping torsional vibrations in the portable supporting stand that are induced by the portable metrology device in operation. As torsional vibrations in the portable supporting stand have, as is described above, can have a significant effect on the accuracy and quality of measurements performed, a reduction of the torsional vibrations will aid in obtaining a dynamically more stable portable supporting stand and thereby enables to do fast and accurate measurements.

It is preferred that the vibration damper unit comprises a movable mass that is movably arranged with respect to the portable supporting stand. As such a movable mass reacts with a certain delay to movements of the portable supporting stand, a restoring (inertia) force acts on the supporting strand, thereby counteracting on the movements to provide a damping effect that reduces vibrations.

Preferably, the vibration damper unit is connected to, in particular connected to only, one or more one elongated members of the portable supporting stand. The vibration damper unit can thereby be positioned at, and connected to, the elongate members at a location wherein an optimal damping performance can be obtained.

In a preferred embodiment, the vibration damper unit is arranged inside one of the elongate members of the portable supporting stand, wherein said elongate member is, preferably, an elongate tubular member. This enables to integrate the vibration damper unit inside of the elongate members, such that an effective coupling between the elongate member and the vibration damper unit can be obtained to achieve a reduction of vibrations in the portable supporting structure. In addition, the compactness of the portable supporting stand, at least when in a transport state, is not negatively affected.

Preferably, the movable mass is movable in at least a direction that is perpendicular to a longitudinal direction of the elongate member. For instance, torsional vibrations of the supporting stands lead to deflections of the supporting stand in a direction comprising a component perpendicular to a longitudinal direction of the elongate element. By providing the mass to be movable in this same direction, the vibration damper unit is able to damp, and thereby reduce, these torsional vibrations. Additionally, or alternatively, this effect can be provided by a preferred embodiment wherein said portable supporting stand, in a deployed state, comprises a substantially central vertical axis and wherein said movable mass is movable in at least a direction that does not intersect the central vertical axis. The deployed state refers to a state wherein the portable supporting structure is setup, i.e. deployed, to allow the portable metrology system to be mounted, whereafter the system can be used for taking measurements. In other words, in the deployed state the portable supporting stand provides for a stable base to support the portable metrology system.

It is preferred that the vibration damper unit comprises a biasing mechanism for urging the movable mass towards a resting position, wherein said movable mass is coupled to the portable supporting stand, in particular to an elongate member thereof, through the biasing mechanism. This enables the movable mass to act as a tuned mass of a so called tuned-mass-damper. By providing a movable mass with a predefined mass and a biasing mechanism with a predefined stiffness, the eigenfrequency of the movable mass, and thereby of the vibration damper unit, can be "tuned" to match the resonance frequency of the portable supporting, or the excitation frequency of the portable metrology device, that causes the unwanted vibrations that affect the measurement accuracy.

It is then further preferred that the biasing mechanism comprises an elastic member, in particular an elastomeric and/or rubber member, that is, preferably, arranged in between the movable mass and an elongate member of the portable supporting stand. Such an elastic member allows to, relatively simply, tune the desired frequency of the vibration damping unit. Additionally, an elastomeric and/or rubber member can deform in more than one direction, thereby allowing the movable mass in the direction that matches best with the induced vibrations of the portable supporting stand, such that a robust and effective damper is obtained. Also, by providing the mass with such one, or more, elastic members, in particular elastomeric and/or rubber members, around its circumference, it can easily be integrated inside of the elongate member, as is described above. This also allows to upgrade existing portable supporting stands, by simply inserting one, or more, movable masses with the circumferential elastic element(s) into a, for instance, tubular elongate member that is comprised in one, or more, legs of the portable supporting stand.

In a preferred embodiment, the portable supporting stand comprises a plurality of, preferably two or three, vibration damper units. Hereby, one can selectively place the vibration damper units to provide for the maximum damping effect on the unwanted vibrations. In addition, it for instance also allows to damp different unwanted vibrations, for instance relating the multiple resonance frequencies of the portable supporting stand. The portable supporting stand can thereby be adapted to allow for more accurate measurements.

In a preferred embodiment of the portable supporting stand, the at least one leg comprises two or more elongate members that are coupled using a coupling member having an open and closed state and wherein said coupling member is arranged to: in an open state, allow at least one elongate member to move, with respect to the other elongate members of the at least one leg, along a direction substantially parallel to a longitudinal axis of at least one respective elongate member, preferably substantially parallel to the longitudinal axes of all respective elongate members, of the at least one leg; and, in a closed state, fixedly couple the respective longitudinal members. Such a telescopic arrangement of the leg, that comprises the two or more elongate members, allows to convert the portable supporting stand to a transport state, wherein the portable supporting stand is more compact and easier to handle when compared to the deployed state, as the leg is made shorter. A first elongate member, that can form a lower leg part is thereby selectively movable with respect to an upper leg part, that can be formed by one, two, or more, elongate members that are preferably arranged substantially parallel with respect to each other. As the coupling member allows to rigidly couple the respective elongate members in the closed state, the portable supporting stand is enabled to rigidly support the portable metrology device in the deployed state.

In a preferred embodiment, said portable supporting stand comprises a tripod comprising three legs and a tripod base member, wherein the three legs are interconnected at their upper end through the tripod base member. A tripod-type support stand provides for a (statically and dynamically) stable type of support having, at least in the deployed state, a wide support base.

Preferably, said legs are pivotally connected to the tripod base member and wherein, in a transport state, the legs are pivoted inwardly with respect to each other, such that the legs are arranged substantially parallel with respect to each other and wherein, in the deployed state, the legs are pivoted outwardly with respect to each other, such that the respective legs are at an acute angle with respect to each other and/or a vertical axis that is substantially perpendicular to the floor surface. Hereby, a statically and dynamically stable supporting stand can be obtained in the deployed state, while enabling a more compact and more easily to handle supporting stand when in the transport state.

It is preferred that said tripod comprises a center column extending downwardly from the tripod base member, wherein a sliding member is arranged to slide along the center column and wherein at least one leg is, preferably all legs are, connected to the sliding member by means of a respective leg brace; wherein, in the transport state, the leg brace runs substantially parallel to its respective leg. This allows to further stiffen the supporting stand in the deployed state, while also obtaining the above described advantages.

In a preferred embodiment, one, two or more vibration damper units are arranged in one leg of the tripod, preferably in only one leg of the tripod. This enables an effective reduction of the undesired vibrations, while not adding to much weight to the portable support stand. Thereby, the total weight of the portable supporting stand is limited, such that it can still be handled and carried by a single person.

It is preferred that the damping vibration unit(s) is arranged to, or in, the upper half of the at least one leg. It is further preferred that the damping vibration unit is arranged to, or in, preferably the upper half of, the upper leg part, in particular in at least one of the elongate members forming the upper leg part. The vibration damper unit is thereby positioned closer to the portable metrology device, i.e. the source of the unwanted vibrations.

In a preferred embodiment, an extending member is removably arranged above the at least one leg for extending the height at which the supporting the portable metrology device is supported, wherein said extending member comprises a longitudinal member that extends, in the deployed state, in a substantial vertical direction. Such an removable extending member enables to increase the height at which the portable metrology device can be supported by the supporting stand, while not negatively affecting the transportability of the overall system.

For removably, while fixedly, mounting the portable metrology device, it is preferred that, at an upper end of the portable supporting stand, a device connector is arranged for removably connecting the portable metrology device to the portable supporting stand, wherein said device connector is, preferably, a threaded connector. Additionally, it is then further preferred that said extending member comprises, at its lower end, a first connector operatively configured for engaging the device connector and, at its upper end, a second connector that is formed equally to the device connector. This allows to easily mount the portable metrology device and the extending member to the same device connector. It is noted that alternative ways of mounting the portable metrology device are also possible, such that the an upper end of the portable supporting stand can comprise means for mounting the portable metrology device, for instance by means of a holder, an adapter, a clamp and/or a bracket.

It is further preferred that the extending member comprises a, or the, vibration damper unit, wherein said vibration damper unit is preferably arranged off-center with respect to a longitudinal central axis of the extending member. The vibration damper unit is then preferably arranged in the upper half, i.e. closer to the upper end, of the extending member. Hereby, the vibration damper unit is arranged closer to the portable metrology device, i.e. the source of the unwanted vibrations. Torsional vibrations are effectively reduced by arranging the vibration damper unit off-center with respect to a longitudinal central axis of the extending member.

In a second aspect, the invention relates to an extending member for use in a portable supporting stand as described above, wherein said extending member comprises a longitudinal member and a vibration damper unit and wherein said extending member is arranged, at a first end, for removably connecting to a portable supporting stand as described above and, at an opposing second end, for removably connecting to a portable metrology device. Such an extending member allows to easily provide, i.e. upgrade, existing portable supporting stands with a vibration damping unit for reducing the unwanted vibrations of the portable metrology device.

In a third aspect, the invention relates to a portable measurement system comprising a portable supporting stand as described and a portable metrology device, in particular a portable laser tracker device. Such as setup can provide for fast and accurate measurements.

It is furthermore noted that the vibration damper unit of the current disclosure can also be applied in general for reducing vibrations in portable supporting stands for supporting portable devices, such as a (video-) camera or a portable measurement instrument. Such portable supporting stands may have less strict rigidness (i.e. stiffness) requirements.

Figure 1:
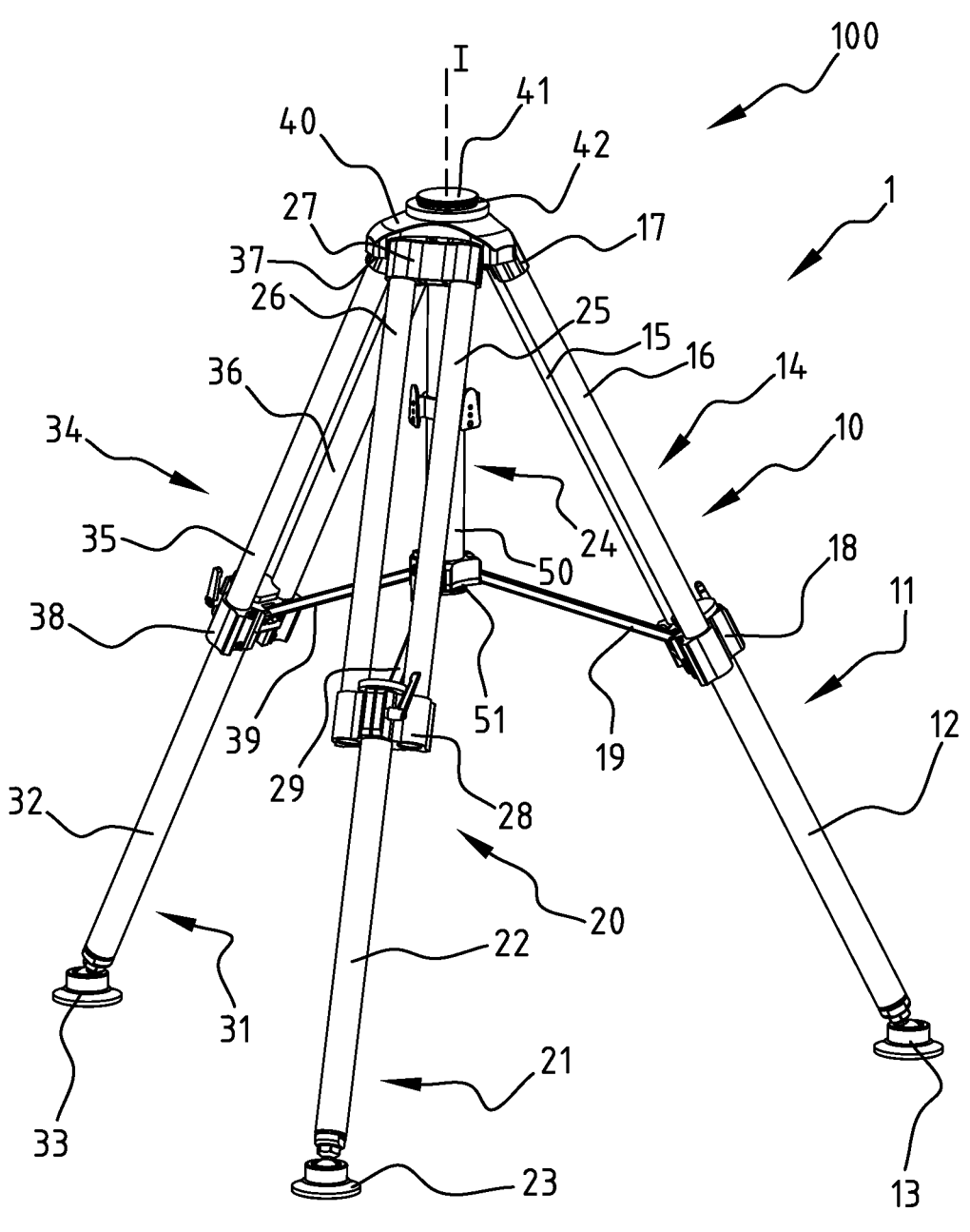

The present invention is further illustrated by the following figures, which show preferred embodiments of the portable support stand, the extending member and the portable measurement sys and are not intended to limit the scope of the invention in any way, wherein:

FIG. 1 schematically shows a three-dimensional perspective view of an embodiment of a portable support stand, in particular a tripod.

FIG. 2 schematically shows a frontal view of the embodiment of the portable support stand, wherein a laser tracker device is mounted on top of the portable support stand.

Figure 3:
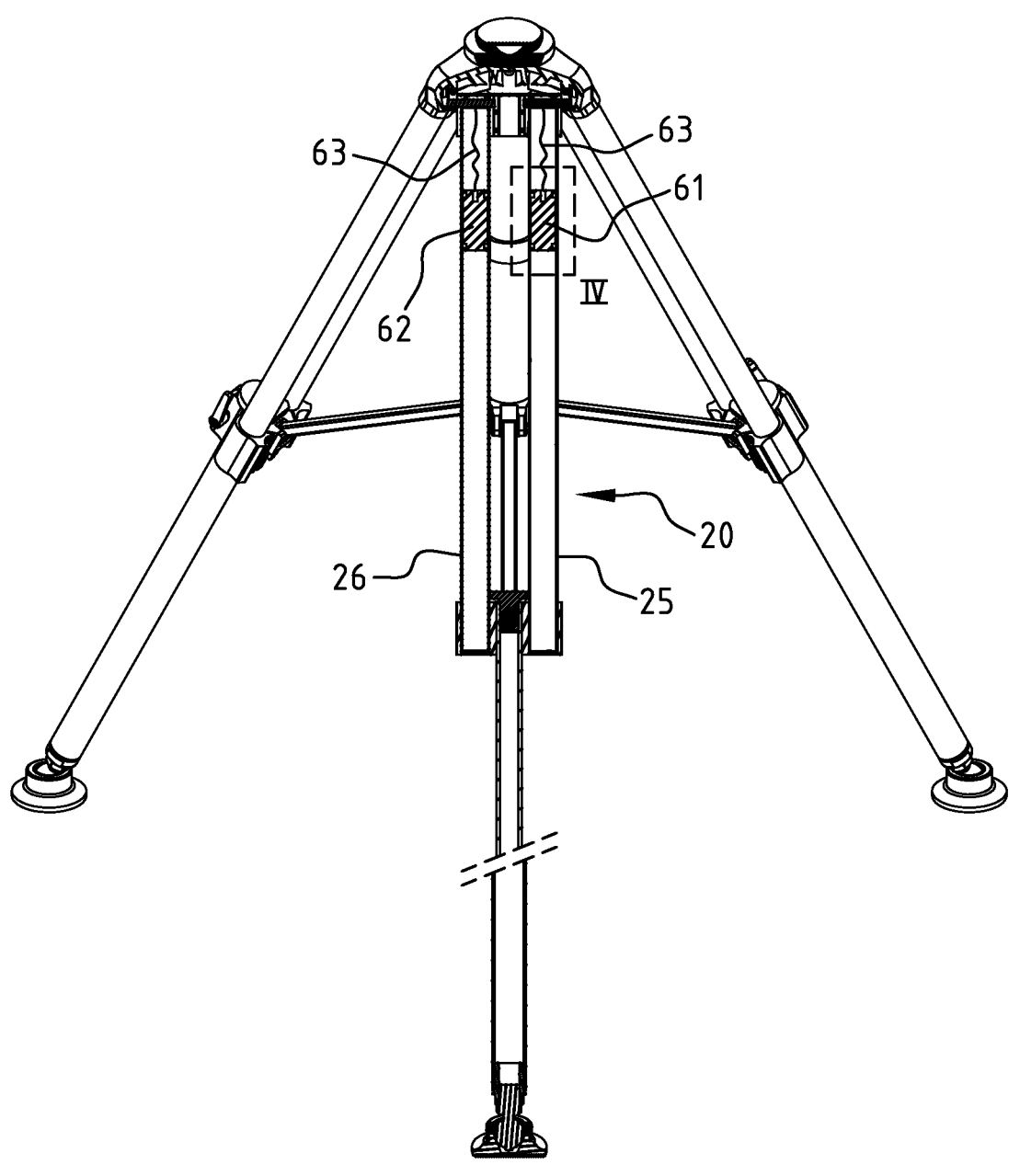

FIG. 3 schematically shows, in a three-dimensional perspective view of the embodiment of the portable supporting stand, a cross-sectional view of one of the legs of the respective tripod.

Figure 4:
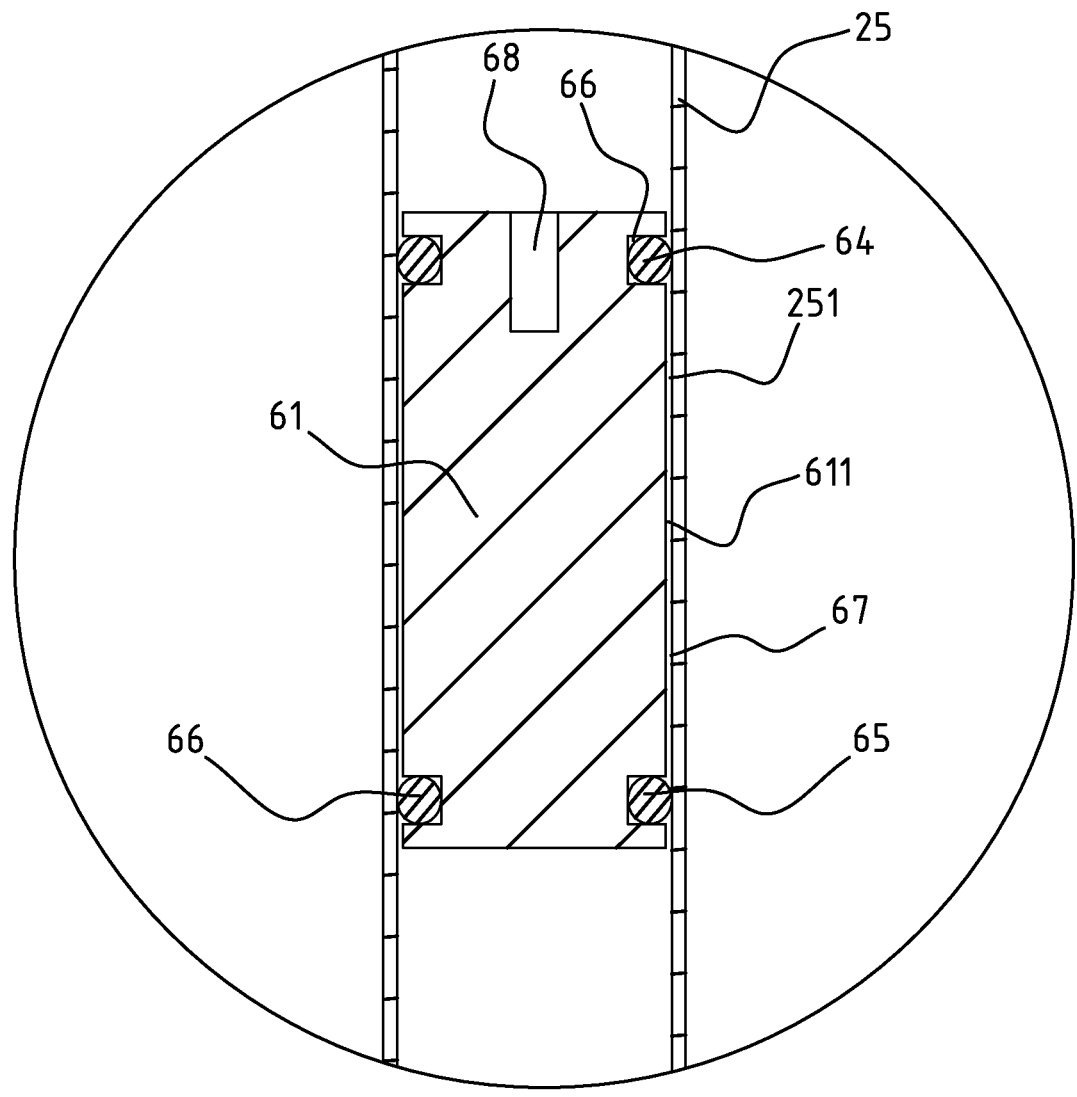

FIG. 4 schematically shows the movable mass that is arranged inside on of the legs of the tripod.

FIG. 5 schematically shows a frontal view a second embodiment of the portable support stand, wherein the portable support stand comprises an extending member.

Figures 6, 7:
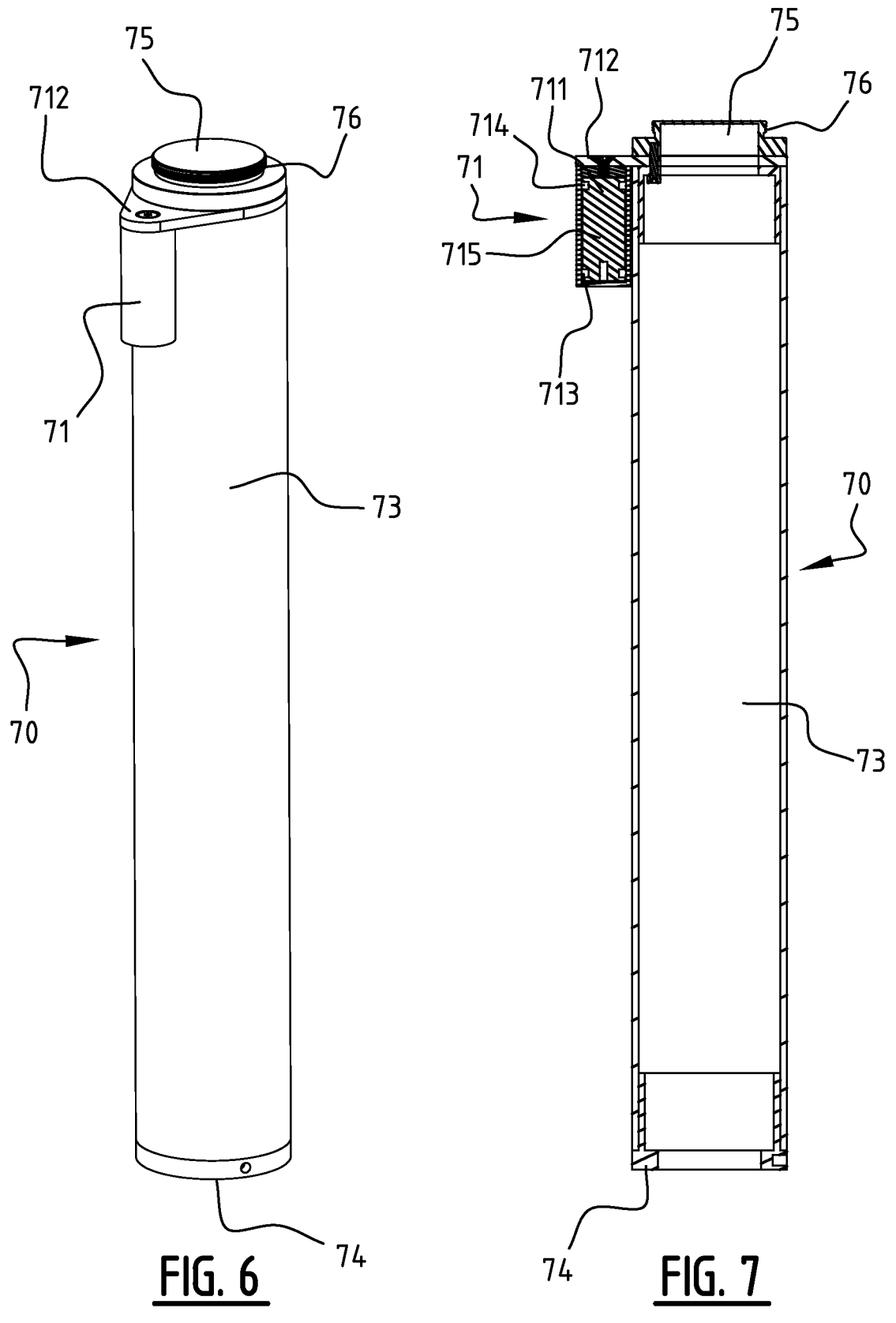

FIG. 6 schematically shows a three-dimensional perspective view of an embodiment of the extending member.

FIG. 7 schematically shows cross-sectional view of an embodiment of the extending member.

FIG. 1 schematically shows a three-dimensional perspective view of an embodiment of the portable supporting stand 100 comprising a tripod 1 comprising three legs 10, 20, 30, in particular telescopic legs, that are pivotally interconnected at the tripod base member 40. At the upper end of the tripod base member 40 a connector 41 for mounting a portable optical metrology device, such as a laser tracker, is arranged. The connector 41 is arranged as a cylindrical protrusion, whereon, on the outer circumferential surface of the cylindrical protrusion a thread 42 is arranged.

The three legs 10, 20, 30 each comprise a lower leg part 11, 21, 31 comprising a respective first elongate tubular member 12, 22, 32 having, at its lower end, a floor abutting member, which is, in the current example, a plate-shaped foot 13, 23, 33 comprising a ball joint such that the flat-bottom of the plate-shaped foot 13, 23, 33 is adjustable to the floor surface. Not that other types of floor abutting members, such as a swivel wheel or a point (or spike) foot, can also be applied to the lower end of the respective first elongate tubular members 12, 22, 32. The legs 10, 20, 30 each further comprise an upper leg part 14, 24, 34 that each comprise two parallel second elongated tubular elements 15, 16, 25, 26, 35, 36 which are interconnected through a first upper leg coupling body 17, 27, 37, that is pivotally connected to the tripod base member 40, and a second upper leg coupling body 18, 28, 38. The first upper leg coupling bodies 18, 28, 38 are interconnected to each other, and thereby interconnect the three legs 10, 20, 30 to each other, through the tripod base member 40.

The second upper leg coupling body 18, 28, 38 also serves a coupling member that interconnects the lower leg part 11, 21, 31 with the respective upper leg part 14, 24, 34 and is switchable from an open state to a closed state and vice versa. In the open state, it allows the respective first elongate tubular member 12, 22, 23 to slide, with respect to the respective upper leg part 14, 24, 34, along a direction substantially parallel to a longitudinal axis of the respective elongate tubular members. In the closed state it fixedly couples the respective longitudinal tubular members of the lower 11, 21, 31 and upper leg parts 14, 24, 34. In the open state, the lower leg parts 11, 21, 31 can slide outwardly with respect to the tripod base member 40 to a predefined maximum position in order to achieve a maximum total length of the respective leg 10, 20, 30 and can slide inwardly with respect to the tripod base member 40 to a predefined minimum position in order to achieve a minimum total length of the respective leg 10, 20, 30. Stop member can be provided for setting the predefined minimum and maximum positions.

The tripod 1 further comprises a center column 50 extending downwardly from the tripod base member 40, wherein a sliding member 51 is arranged to slide along the center column 50. The legs 10, 20, 30 can be connected to the sliding member 51 by means of a respective leg braces 19, 29, 39 that are connected to the respective legs 10, 20, 30 through the second upper leg coupling body 18, 28, 38. In the deployed state of the tripod 1, as is shown in FIG. 1, the legs 10, 20, 30 are pivoted outwardly with respect to each other, such that the respective legs 10, 20, 30 are at an acute angle with respect to each other and/or a vertical axis I that is substantially perpendicular to the floor surface. In the deployed state, the sliding member 51 is positioned at a lower end of the center column 50, such that the leg braces 19, 29, 39 extend outwardly with respect to the vertical axis I in a radial direction. In a transport state (not shown), the legs 10, 20, 30 are folded inwardly with respect to each other, such that the legs 10, 20, 30, and if applicable, also the leg braces 19, 29, 39 run substantially parallel to each other and the center column 50 and are arranged adjacently to each other and the center column 50. In the transport state, the telescopic legs 10, 20, 30 are preferably also brought to their minimum length, as is described above.

FIG. 2 schematically shows a frontal view of an embodiment of an embodiment of a portable measurement system 1000, comprising the portable support stand 100 of FIG. 1, wherein a laser tracker device 200 is mounted on top of the portable support stand 100. The laser tracker device 200 comprises a laser 203 arranged for emitting the laser beam that is arranged inside a measurement head 202 that is rotatably (around an horizontal axis II) mounted inside a main laser tracker body 201 that is rotatable with respect to the vertical axis I, thereby enabling the laser beam to scan a spherical space surrounding the laser tracker 200. In FIG. 2 it is seen that a pair of movable masses 61, 62 are arranged inside of the two parallel second elongated tubular elements 25, 26 of the second leg 20. As is also seen in FIGS. 3 and 4, these movable masses 61, 62 are flexibly suspended inside of the respective tubular elements 25, 26, such that the movable masses 61, 62 can move with respect to the respective tubular elements 25, 26 in at least the three translational directions and preferably also in the three rotational directions. The movable masses 61, 62 are arranged in the upper half, more specifically in the upper third of the of the respective tubular elements 25, 26, such that they are positioned near the upper end of the elongate tubular elements 25, 26 and thereby near the second upper leg coupling body 28, near the tripod base member 40 and near the laser tracker device 200, which is the source of the vibrations induced.

FIG. 3 schematically shows, in a three-dimensional perspective view of the embodiment of the portable supporting stand 100 of FIGS. 1 and 2, a cross-sectional view of the second leg 20 of the respective tripod 1. The movable masses 61, 62 can be provided with a safety line 63 that prevents, when the movable masses would come lose inside of the respective tubular elements 25, 26, the movable masses 61, 62 from falling down and potentially damaging the tripod 1, in particular the first upper leg coupling body 27 and/or the second leg 20 in general.

FIG. 4 shows the first movable masses 61 in more detail. The movable mass 61 is shaped to substantially match the cross-section of the elongate tubular element 25, such that it slightly smaller to allow a gap 67 between an inner surface 251 of the elongate tubular element 25 and an outer surface 611 of the movable mass 61, such that relative movement is allowed in all directions.

The movable mass 61 is arranged, at (i.e. near) both ends with circumferential recesses 66 allow the placement of two elastic elements 64, 65, in particular O-rings made of a rubber and/or elastomeric material. The elastic elements 64, 65 have an outer size that is slightly larger than the inner size of the elongate tubular element 25, such that, upon mounting, a compressive preload is applied to the elastic elements 64, 65 that, on the basis of friction between the elastic elements 64, 65 and the inner surface 251, keep the elastic elements 64, 65 stationary within the elongate tubular elements. Deformation of the elastic elements 64, 65 allows the relative movement of the movable mass 65 in all directions. By a tuning the stiffness of the elastic elements 64, 65, for instance through their material properties and size, and by tuning the mass of the movable mass 65, for instance by varying its length or providing a hollowed out portion 68, the eigenfrequency/eigenfrequencies of the hereby obtained vibration damping unit, that acts as a tuned mass damper, that can be matched with the resonance frequency/frequencies of the portable support stand 100 causing the measurement errors. Hereby an effective damping of these frequencies can be achieved, such that an increased measurement accuracy is obtained.

FIG. 5 schematically shows a frontal view a second embodiment of a portable support stand 200, wherein the portable support stand 200 comprises the tripod 1 as shown in FIGS. 1-4 and an extending member 70 that is arranged on top of the tripod 1. The extending member 70, as is also shown in FIGS. 6 and 7, is arranged for increasing the height at which a portable metrology device, such as the laser tracker 200, can be supported. The extending member 70 comprises a longitudinal member 73 that extends, in the deployed state as shown in FIG. 5, in a substantial vertical direction along the vertical axis I. The current example of the extending member 70 comprises an externally mounted off-center vibration damper unit 71. The vibration damper unit 71 is constructed substantially the same as the vibration damper units that are arranged in the second leg 20 of the tripod.

A movable mass 711 is elastically suspended in a housing member 715 using elastic elements 713, 714 that are compressed between the circumferential recesses of the movable mass and an inner surface of the housing member 715. A connection body 712 is arranged for connecting the vibration damper unit 71 to an upper end of the (tubular) longitudinal member 73. A second connector 75, comprising an external thread 76, that is substantially equal to the device connector 41 arranged at the top of the tripod base member 40, is arranged at the upper end of the extending member 70. Thereby the portable metrology device can directly be mounted onto the extending member 70. At the lower end of the extending member 70, a first connector is arranged for engaging with the device connector 41 of the tripod base member 40. The first connector is hereby arranged with a cooperating internal thread.

Although the vibration damper unit 71 is, in the current example, externally mounted to the extending member 70, a vibration damper unit 72 can alternatively be mounted off-center inside of the extending member 70, as is indicated using dashed lines in FIG. 5. It is further noted that, although in current example the second leg 20 also comprises vibration damping units, the portable supporting stand can also be fitted with only a vibration damper unit 71, 72 attached to the extending member 70.

Tests have been performed with first laser tracker measurement setup comprising a portable supporting stand, in particular a tripod, fitted with a vibration damper unit as described above and with a second laser tracker measurement setup comprising a portable supporting stand, in particular a tripod, without such a vibration damper unit. Positional measurements were taken for two different points at respective approximate coordinates with respect to the laser tracker at $x1=3.03$ m, $y1=3.37$ m, $z1=0.13$ m and $x2=3.91$ m, $y2=2.42$ m, $z2=0.17$. Whereas the measurements taken with the first setup resulted in measurement errors<0.02 mm for the x- and y-coordinates and <0.04 mm for z-coordinates, the measurements could not be taken with the second setup as the laser was, due to vibrations in the setup, not able to track the position of both points. These tests verified the effectiveness of the combination of a substantially rigid portable supporting stand and a vibration damper unit, as described above.

The present invention is not limited to the embodiment shown, but extends also to other embodiments falling within the scope of the appended claims.

The invention claimed is:

1. A portable supporting stand for supporting a portable metrology device at a predefined height comprising:
   at least one leg comprising an elongated member, wherein, in a deployed state, the portable supporting stand is a substantially rigid support stand that is arranged to substantially rigidly support the portable metrology device on a floor surface, and
   a vibration damper unit for damping torsional vibrations in the portable supporting stand that are induced by the portable metrology device in operation,
   wherein the vibration damper unit is arranged for reducing said vibrations of the portable supporting stand without altering the position of, and/or moving, the portable metrology device with respect to the floor surface.

2. The portable supporting stand according to claim 1, wherein the substantially rigid support stand is arranged to substantially not deform under the influence of the weight of the portable metrology device.

3. The portable supporting stand according to claim 1, wherein the vibration damper unit comprises a movable mass that is movably arranged with respect to the portable supporting stand.

4. The portable supporting stand according to claim 3, wherein the vibration damper unit is connected to one or more one elongated members of the portable supporting stand; and wherein the movable mass is movable in at least a direction that is perpendicular to a longitudinal direction of the one or more elongated members.

5. The portable supporting stand according to claim 1, wherein the vibration damper unit is connected to one or more one elongated members of the portable supporting stand.

6. The portable supporting stand according to claim 1, wherein the vibration damper unit is arranged inside one of the elongate members of the portable supporting stand.

7. The portable supporting stand according to claim 1, wherein the portable supporting stand comprises a plurality of vibration damper units.

8. The portable supporting stand according to claim 1, wherein the at least one leg comprises two or more elongate members that are coupled using a coupling member having an open and closed state and wherein said coupling member is arranged to:
   in an open state, allow at least one elongate member to move, with respect to the other elongate members of the at least one leg, along a direction substantially parallel to a longitudinal axis of at least one respective elongate member; and,
   in a closed state, fixedly couple the respective elongate members.

9. The portable supporting stand according to claim 1, wherein said portable supporting stand comprises a tripod comprising three legs and a tripod base member, wherein the three legs are interconnected at their upper end through the tripod base member.

10. The portable supporting stand according to claim 9, wherein said legs are pivotally connected to the tripod base member and wherein, in a transport state, the legs are pivoted inwardly with respect to each other, such that the legs are arranged substantially parallel with respect to each other and wherein, in the deployed state, the legs are pivoted outwardly with respect to each other, such that the respective legs are at an acute angle with respect to each other and/or a vertical axis that is substantially perpendicular to the floor surface.

11. The portable supporting stand according to claim 9, wherein said tripod comprises a center column extending downwardly from the tripod base member, wherein a sliding member is arranged to slide along the center column and wherein at least one leg is connected to the sliding member by means of a respective leg brace; wherein, in the transport state, the leg brace runs substantially parallel to its respective leg.

12. The portable supporting stand according to claim 9, wherein one, two or more vibration damper units are arranged in one leg of the tripod.

13. The portable supporting stand according to claim 1, wherein an extending member is removably arranged above the at least one leg for extending the height at which the supporting the portable metrology device is supported, wherein said extending member comprises a longitudinal member that extends, in the deployed state, in a substantial vertical direction.

14. The portable supporting stand according to claim 13, wherein, at an upper end of the portable supporting stand, a device connector is arranged for removably connecting the portable metrology device to the portable supporting stand, wherein said device connector is a threaded connector; and wherein said extending member comprises, at its lower end, a first connector operatively configured for engaging the device connector and, at its upper end, a second connector that is formed equally to the device connector.

15. The portable supporting stand according to claim 13, wherein said extending member comprises a, or the, vibration damper unit.

16. An extending member for use in the portable supporting stand according to claim 15, wherein said extending member comprises a longitudinal member and a vibration damper unit and wherein said extending member is arranged, at a first end, for removably connecting to a portable supporting stand according to any of the preceding claims and, at an opposing second end, for removably connecting to a portable metrology device.

17. The portable supporting stand according to claim 1, wherein, at an upper end of the portable supporting stand, a device connector is arranged for removably connecting the portable metrology device to the portable supporting stand.

18. A portable metrology system comprising the portable supporting stand according to claim 1 and a portable metrology device.

19. A portable supporting stand for supporting a portable metrology device at a predefined height comprising:

at least one leg comprising an elongated member, wherein, in a deployed state, the portable supporting stand is a substantially rigid support stand that is arranged to substantially rigidly support the portable metrology device on a floor surface, and a vibration damper unit for reducing vibrations of the portable supporting stand, wherein the vibration damper unit is arranged for reducing vibrations of the portable supporting stand without altering the position of, and/or moving, the portable metrology device with respect to the floor surface, wherein the vibration damper unit comprises a movable mass that is movably arranged with respect to the portable supporting stand; and wherein said portable supporting stand, in a deployed state, comprises a substantially central vertical axis and wherein said movable mass is movable in at least a direction that does not intersect the central vertical axis.

20. A portable supporting stand for supporting a portable metrology device at a predefined height comprising:

at least one leg comprising an elongated member, wherein, in a deployed state, the portable supporting stand is a substantially rigid support stand that is arranged to substantially rigidly support the portable metrology device on a floor surface, and a vibration damper unit for reducing vibrations of the portable supporting stand, wherein the vibration damper unit is arranged for reducing vibrations of the portable supporting stand without altering the position of, and/or moving, the portable metrology device with respect to the floor surface, wherein the vibration damper unit comprises a movable mass that is movably arranged with respect to the portable supporting stand, and wherein the vibration damper unit comprises a biasing mechanism for urging the movable mass towards a resting position, wherein said movable mass is coupled to the portable supporting stand through the biasing mechanism.

21. The portable supporting stand according to claim 20, wherein the biasing mechanism comprises an elastic member.

\* \* \* \* \*